United States Patent
Daffern et al.

(10) Patent No.: US 12,062,928 B2
(45) Date of Patent: Aug. 13, 2024

(54) MANAGING POWER DISCHARGE WITHIN A GROUP OF DEVICES

(71) Applicant: INTERNATIONAL BUSINESS MACHINES CORPORATION, Armonk, NY (US)

(72) Inventors: Nicholas J. Daffern, Truro (GB); Aiziel Nazario, Douglas (GB); Francesca Morris, Purley (GB); Giacomo G. Chiarella, Eastleigh (GB); Luke R. Viner, Bristol (GB)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 16/251,137

(22) Filed: Jan. 18, 2019

(65) Prior Publication Data

US 2020/0235590 A1    Jul. 23, 2020

(51) Int. Cl.
*H02J 7/00* (2006.01)
*H02J 50/80* (2016.01)

(52) U.S. Cl.
CPC ........ *H02J 7/0013* (2013.01); *H02J 7/00032* (2020.01); *H02J 50/80* (2016.02)

(58) Field of Classification Search
CPC .................................................. H02J 50/40
See application file for complete search history.

(56) References Cited

U.S. PATENT DOCUMENTS

| | | | | |
|---|---|---|---|---|
| 5,832,388 | A * | 11/1998 | Williams | H04B 1/3883 |
| | | | | 455/425 |
| 7,013,205 | B1 * | 3/2006 | Hafner | B60W 10/06 |
| | | | | 701/22 |
| 8,661,268 | B2 | 2/2014 | Brooks et al. | |
| 9,285,851 | B2 * | 3/2016 | Hodges | G06F 1/3206 |
| 9,577,463 | B2 | 2/2017 | McCoy et al. | |
| 9,692,250 | B2 | 6/2017 | Priev et al. | |
| 9,917,462 | B2 * | 3/2018 | Won | G06F 1/266 |
| 9,948,118 | B1 * | 4/2018 | Patton | H02J 7/0042 |
| 9,952,647 | B2 * | 4/2018 | Chakra | G06F 1/26 |
| 9,955,313 | B1 | 4/2018 | Bacarella | |
| 9,955,314 | B1 | 4/2018 | Bacarella | |

(Continued)

OTHER PUBLICATIONS

Cell Phone Cables & Adapters—Ebay,Jun. 2017.*

(Continued)

*Primary Examiner* — Drew A Dunn
*Assistant Examiner* — Tynese V McDaniel
(74) *Attorney, Agent, or Firm* — Anthony R. Curro

(57) ABSTRACT

Methods and systems are provided for effectively managing power discharge within a group of devices. An orchestrating device specifies a group of member devices at a location between which power is capable of being transferred. Discharging metadata of at least some of the group of member devices that are potential discharging devices capable of acting as a discharging device at a current time is obtained. The discharging metadata may include: a charge available in the discharging device for discharging to a receiving device, and discharging capability data for discharging the discharging device by current transfer to a receiving device. A preferred potential discharging device to act as a discharging device based on evaluation of the discharging metadata may be determined.

22 Claims, 7 Drawing Sheets

(56) References Cited

U.S. PATENT DOCUMENTS

| | | | |
|---|---|---|---|
| 9,955,428 B1* | 4/2018 | Bacarella | G06Q 50/06 |
| 9,996,397 B1* | 6/2018 | Catalano | G06F 9/5061 |
| 10,310,591 B2* | 6/2019 | Bostick | G06F 1/329 |
| 2012/0272077 A1* | 10/2012 | Dow | G06F 1/1698 |
| | | | 713/310 |
| 2013/0134923 A1* | 5/2013 | Smith | H02J 50/10 |
| | | | 320/103 |
| 2014/0183962 A1* | 7/2014 | Qian | H02J 50/12 |
| | | | 307/104 |
| 2015/0042264 A1* | 2/2015 | Leabman | H04B 5/0037 |
| | | | 320/108 |
| 2015/0077126 A1* | 3/2015 | Wang | H04W 52/0258 |
| | | | 324/427 |
| 2017/0083073 A1* | 3/2017 | Chakra | H02J 7/00034 |
| 2018/0115170 A1* | 4/2018 | Bacarella | H02J 7/0027 |
| 2019/0107406 A1* | 4/2019 | Cox | G01C 21/3679 |

OTHER PUBLICATIONS https://www.ravpower.com/ismart, "i Smart+ 2.0 Charge Faster Charge Smarter",iSmart Technology: automatically detects and delivers the optimal chargi . . . , printed Sep. 5, 2018, pp. 1-4.

https://priorart.ip.com/IPCOM/000252903, "Method and system for intelligent device to device wireless power transfer to ensure continuity of content display in same device", printed Sep. 5, 2018, pp. 1-3.

Bulut et al., "Mobile Energy Sharing Through Power Buddies", Proc. 2017 IEEE Wireless Communications and Networking Conference (WCNC), Mar. 19-22, 2017, pp. 1-6.

https://support.apple.com/en-gb/HT204377, "Powering peripherals through USB—Apple Support", printed Nov. 21, 2018, pp. 1-5.

Liu, The Ultimate Guide To Capacity (MAH, WH) and Efficiency of Portable Chargers (A.K.A. Power Banks or External Batteries), Dec. 1, 2013, pp. 1-8.

Mell et al., "The NIST Definition of Cloud Computing", National Institute of Standards and Technology, Special Publication 800-145, Sep. 2011, pp. 1-7.

Gokey, "Samsung's New Power Shring Cable Will Let Your Devices Charge Each Other", https://www.digitaltrends.com/mobile/samsung-micro-usb-power-sharin . . . , Samsung Power Sharing Cable Connects Two devices | Digital Trends, Sep. 23, 2014, pp. 1-12.

Sharwood, "New USB Spec Offers Two-way Power Flows and Double-sided Plug", Personal Tech, https://www.theregister.co.uk/2014/09/10/new_usb_spec_offers_twowa . . . , Sep. 10, 2014, pp. 1-6.

Zendure, Power Banks (/Collections/A-Series-Portable-Chargers), https://zendure.com/collections/all, printed Jan. 18, 2019, pp. 1-5.

\* cited by examiner

MANAGING POWER DISCHARGE WITHIN A GROUP OF DEVICES

FIELD

Embodiments relate to managing power discharge within a group of devices and, more specifically, managing power discharge in an effective manner based on metadata of available devices of the group.

BACKGROUND

A person may carry with them a large quantity of electrical energy stored in multiple batteries in multiple battery-powered devices. Methods exist for transferring power from one device to another. These methods may be used to transfer power to devices that are running low or that have run out of power.

SUMMARY

According to a first aspect of one embodiment, there is provided a computer-implemented method for managing power discharge within a group of devices, which may be carried out by an orchestrating device, comprising: specifying a group of member devices at a location between which power is capable of being transferred; obtaining discharging metadata of at least some of the group of member devices that are potential discharging devices capable of acting as a discharging device at a current time, wherein the discharging metadata includes: a charge available in the discharging device for discharging to a receiving device; and discharging capability data for discharging the discharging device by current transfer to a receiving device; and determining a preferred potential discharging device to act as a discharging device based on evaluation of the discharging metadata.

This method has the advantage of basing a recommendation on the needs of the potential discharging devices to ensure that they have sufficient power to be used as a discharging device.

Determining a preferred device to act as a discharging device may include ensuring that a charge available in a potential discharging device for discharging to a receiving device accommodates a remaining charge in the potential discharging device for a predicted operation of the potential discharging device. Determining a preferred potential discharging device may include predicting a future usage of a potential discharging device based on one or more of the group of: current usage, historical use data, and location data. Determining a preferred potential discharging device may also include ranking or prioritizing the potential discharging devices based on the predicted future usage of potential discharging devices in conjunction with the discharging metadata.

The needs of the potential discharging devices are determined based on a predicted operation of the devices that may be obtained by evaluating current and past usage and location data.

The method may include obtaining receiving metadata for a specific receiving device, and wherein determining a preferred potential discharging device is additionally based on the receiving metadata of a specific receiving device.

Determining a preferred potential discharging device may include using the discharging capability data and receiving metadata to evaluate discharging from the potential discharging device to a specific receiving device whilst accommodating the operation of the potential discharging device and the specific receiving device. The receiving metadata may include: a current charge level of the receiving device, and a current rate of use of the charge of the receiving device.

The discharging capability data may include or may be used to determine data relating to a connection between the potential discharging device and a receiving device including one or more of the group of: a distance between the potential discharging device and the receiving device; a form of port at the potential discharging device; and a form of connecting cable used.

The discharging capability data may include various discharging options including one or more of the group of: use of multiple ports, charging only a single receiving device; charging multiple receiving devices; an order of connections of multiple receiving devices to the discharging device.

The method may include determining a preferred discharging arrangement and optimal length of discharging time.

In one embodiment, the method may include determining a receiving device to receive a transfer of power from the discharging device including ranking or prioritizing charging one or more member devices as receiving devices based on use or predicted use of the one or more member devices.

The method may include: sending a notification to a receiving device to obtain charge from a recommended discharging device and/or sending a notification to a recommended discharging device to discharge to a receiving device. This may include specifying a recommended charging duration and/or charging arrangement between the recommended discharging device and the receiving device.

Specifying a group of member devices may include a barrier to entry of non-participating devices at the location and may include: a fixed group of connected member devices at a location; or a variable group of mobile devices at a location.

The orchestrating device may be one of the specified group of devices and is one of: a designated device in the group; or an initiating device at a current time, wherein the initiating device requires charge or acts on behalf of another device requiring charge.

The method may include: determining a current location of the group of member devices; and using historical user data for the group of member devices to determine an estimated time to an external charging location; and including the estimated time when determining a preferred potential discharging device.

The method may also include: initializing a charge transfer procedure by the orchestrating device; and polling available member devices from the group for discharging metadata over a current period of time via a wireless communication between member devices and the orchestrating device.

According to aspect of an another embodiment there is provided a system for managing power discharge within a group of devices comprising: an orchestrating device in communication with the group of devices and having a processor and a memory configured to provide computer program instructions to the processor to execute the function of the components; a group component for specifying a group of member devices at a location between which power is capable of being transferred; a discharge metadata component for obtaining discharging metadata of at least some of the group of member devices that are potential discharging devices capable of acting as a discharging device at a current time, wherein the discharging metadata includes: a charge available in the discharging device for discharging to a receiving device; and discharging capability data for discharging the discharging device by current transfer to a receiving device; and a discharging device recommending component for determining a preferred potential discharging device based on evaluation of the discharging metadata.

The system may include a use prediction component for predicting a future usage of a device; and wherein the discharging device recommending component includes ensuring that a charge available in a potential discharging device for discharging to a receiving device accommodates a remaining charge in the potential discharging device for a predicted operation of the potential discharging device.

The system may include a receiving metadata component for obtaining receiving metadata for a specific receiving device, and wherein determining a preferred potential discharging device is based on the receiving metadata of a specific receiving device.

The system may also include: a notification component for sending a notification to a receiving device to obtain charge from a recommended discharging device and/or sending a notification to a recommended discharging device to discharge to a receiving device.

The system may include a location component for: determining a current location of the group of member devices; and a historical location data component for using historical user data for the group of member devices and a charge time estimation component for determining an estimated time to an external charging location.

The orchestrating device may be one of the specified group of devices and is one of: a designated device in the group; or an initiating device at a current time, wherein the initiating device requires charge or acts on behalf of another device requiring charge.

The system may include: an initializing component for initializing a charge transfer procedure by the orchestrating device; and a metadata polling component for polling available member devices from the group for discharging metadata over a current period of time via a wireless communication between member devices and the orchestrating device.

According to another aspect of another embodiment there is provided a computer program product for managing power discharge within a group of devices carried out by an orchestrating device, the computer program product comprising a computer readable storage medium having program instructions embodied therewith, the program instructions executable by a processor to cause the processor to: specify a group of member devices at a location between which power is capable of being transferred; obtain discharging metadata of at least some of the group of member devices that are potential discharging devices capable of acting as a discharging device at a current time, wherein the discharging metadata includes: a charge available in the discharging device for discharging to a receiving device; and discharging capability data for discharging the discharging device by current transfer to a receiving device; and determine a preferred potential discharging device to act as a discharging device based on evaluation of the discharging metadata.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
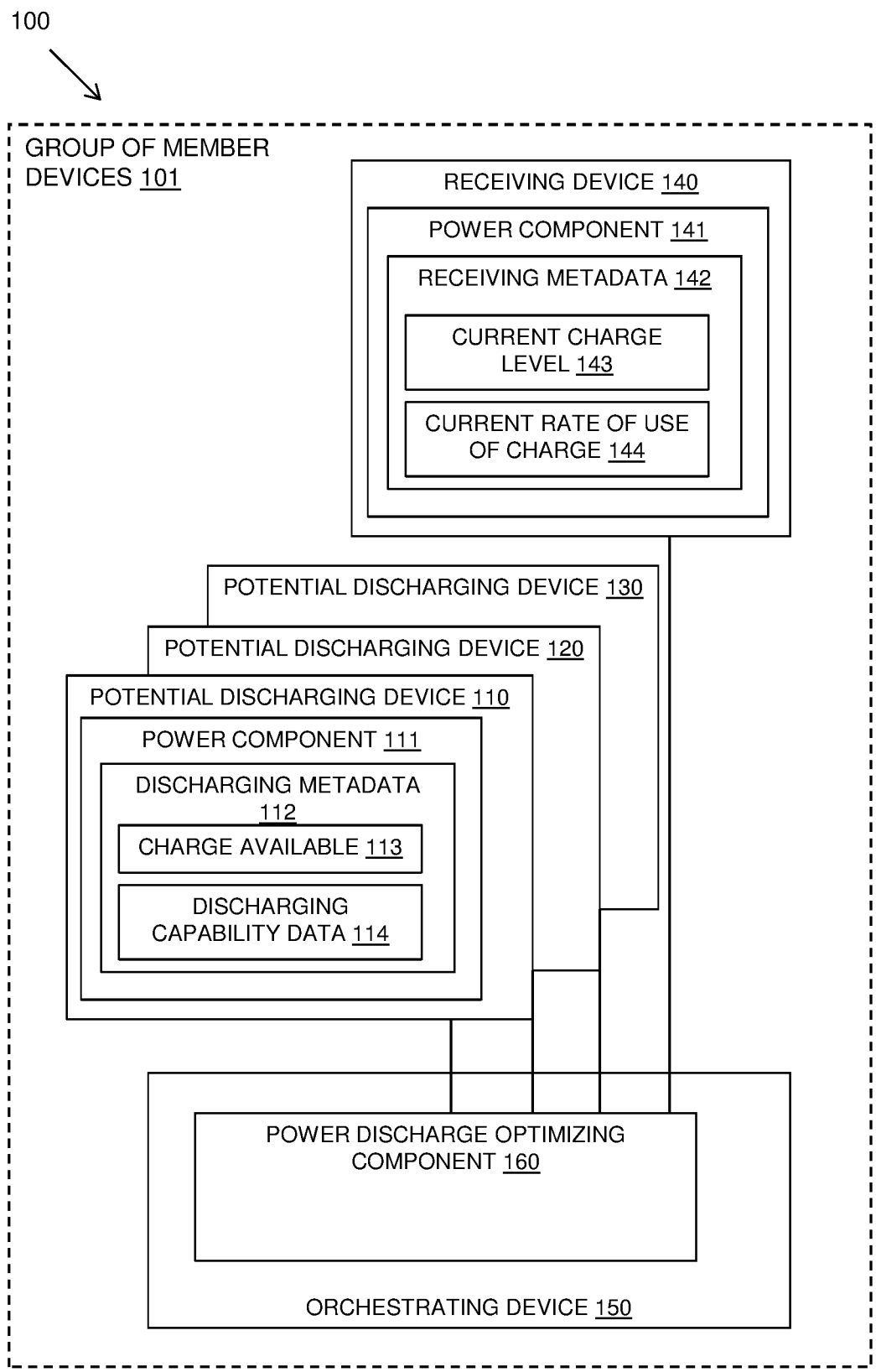
FIG. 1 is a schematic diagram of a group of devices in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A person may carry with them a large quantity of electrical energy stored in multiple batteries in multiple devices, but they may have devices that run out of power. While systems exist that can transfer power from one device to another, a user must make a decision about which device to drain power from and which device to charge with this power.

If a user does not know the relative storage capacity of each of their devices they may make poor decisions about which device should be drained and which charged. If a decision is made too late, for example, when a device is on 5% power, another device may also be low on power and the correct device to source power from may not have the ability to source enough current to charge both of the low power devices.

A user may also not be aware of the rate of power consumption of devices and how long they may last at current usage before a power socket can be found and all devices can be restored to full charge.

In addition, power discharge management may also necessary in other scenarios where battery-powered devices are at a fixed location.

The described method and system provide for management of power discharge within a group of devices. The method and system may be applied across multiple situations where there is a group of devices with batteries, each with a level of charge and a rate of consumption, and a need to charge at least one of them. The method selects a device to be discharged from potential discharging devices in the group to charge the battery in need. The aim of the selection is to ensure that the discharging of the selected device does not impact the use of the discharging device.

The described methods treat the batteries of devices in a group as potential power sources and recommend which device's battery out of the group should be selected to be discharged. This recommendation may include predicting how long a potential discharging device can be used as a power source to ensure that a user of the discharging device can operate it normally until they can charge it. This may involve predicting the future usage of the potential discharging devices. The method enables the distribution of a finite amount of energy within a group of devices to ensure one or more users can normally operate devices within that group, while minimizing unnecessary power transfers.

While the terms "optimum," "optimal," "optimizing," or the like are sometimes used herein, it should be understood that these terms are not intended to imply that any solution, preference, or recommendation generated by the method is the best, greatest, or most effective. Use of these terms is intended to mean that the solution, preference, or recommendation generated by the method is consistent with the aims and goals of the invention, e.g., managing power discharge for a group of devices in a way that ensures that the discharging of a particular discharging device does not impact a normal or anticipated use of the discharging device by a user.

Referring to FIG. 1, a schematic diagram 100 illustrates an example embodiment of a group of member devices 101 in which the described method and system of managing power discharge within a group of devices may be implemented.

The group of member devices 101 may include some devices in the group 101 that are potential discharging devices 110, 120, 130 that are capable of discharging to provide a power source to other devices in the group. Other devices in the group 101 may be receiving devices 140 that are only capable of receiving power. A further category of device in the group 101 is an orchestrating device 150 that may carry out the described processing to recommend a potential discharging device 110, 120, 130 in the group 101 as the "optimal" or preferred potential discharging device. A device can fall in one or more category of device. Further more than one potential discharging device may satisfy criteria to be suitable for use as the "optimal" or preferred potential discharging device.

The orchestrating device 150 includes a power discharge optimizing component 160 which may be an application installed on a member device providing the functionality for receiving discharging metadata 112 and, optionally, receiving metadata 142 from other member devices 110, 120, 130, 140 in the group 101 and processing this metadata to recommend a member device to act as a discharging device to another member device in the group 101.

The potential discharging devices 110, 120, 130 each include a power component 111 that obtains discharging metadata 112 from its own device including at least a charge available 113 and discharging capability data 114. The discharging metadata 112 may include additional information and data depending on the device.

The receiving devices 140 each include a power component 141 that obtains receiving metadata 142 from its own device including at least a current charge level 143 and a current rate of use of charge 144.

This described arrangement incorporates multiple different scenarios of groups of member devices 101 and provides a recommendation of a potential discharging device 110, 120, 130 from the group of member devices that are capable of acting as a power source based on the discharging metadata 112. The recommendation may take into account the predicted future use requirements of the discharging devices 110, 120, 130 as described further below.

In one scenario, the group of member devices 101 may be portable electronic devices of a user that are all at a same location of the user. The portable electronic devices may all have varying amounts of battery power and may be needed for use by the user with varying degrees of importance. One or more of the devices may have the capability to act as an orchestrating device 150 to determine a recommended device to use as a discharging device from the group. The orchestrating device 150 may determine this for itself, if it needs charging, or on behalf of another device that is already low on charge or does not have the processing capability to carry out the determination.

In this scenario, all devices in the group 101 that have the processing capability to act as orchestrating devices 150 may have the power discharge optimizing component 160. Where the orchestrating device 150 is acting for itself to determine a potential discharging device 110, 120, 130 to obtain a charge from, it may reference its own receiving metadata 142 and also includes the functionality of the power component 141 of a receiving device 140. However, if it acts for another receiving device 140 that does not have the processing power to be an orchestrating device 150, the other receiving device 140 will have a power component 141 for providing its receiving metadata 142 to the orchestrating device 150.

An orchestrating device 150 may also be capable of acting as a potential discharging device 110, 120, 130 when acting as the orchestrating device 150 or when another device in the group 101 is acting as the orchestrating device 150. Therefore a device may include the power component 111 functionality as well as the power discharge optimizing component 160 functionality and these may be combined or interrelated in an application or applications on a device. However, if a discharging device 110, 120, 130 does not have the processing power to act as an orchestrating device 150, the discharging device 140 will have a power component 111 for providing its discharging metadata 142 to an orchestrating device 150.

In another scenario, the group of member devices 101 may be at a fixed location and there may be a designated orchestrating device 150. For example, the group of member devices 101 may be household devices in a house with a smart processing unit that is the orchestrating device 150. Each of the household devices may have a power component 111 for providing their discharging metadata 112 and/or receiving metadata 142 to the orchestrating device 150.

Figure 2:
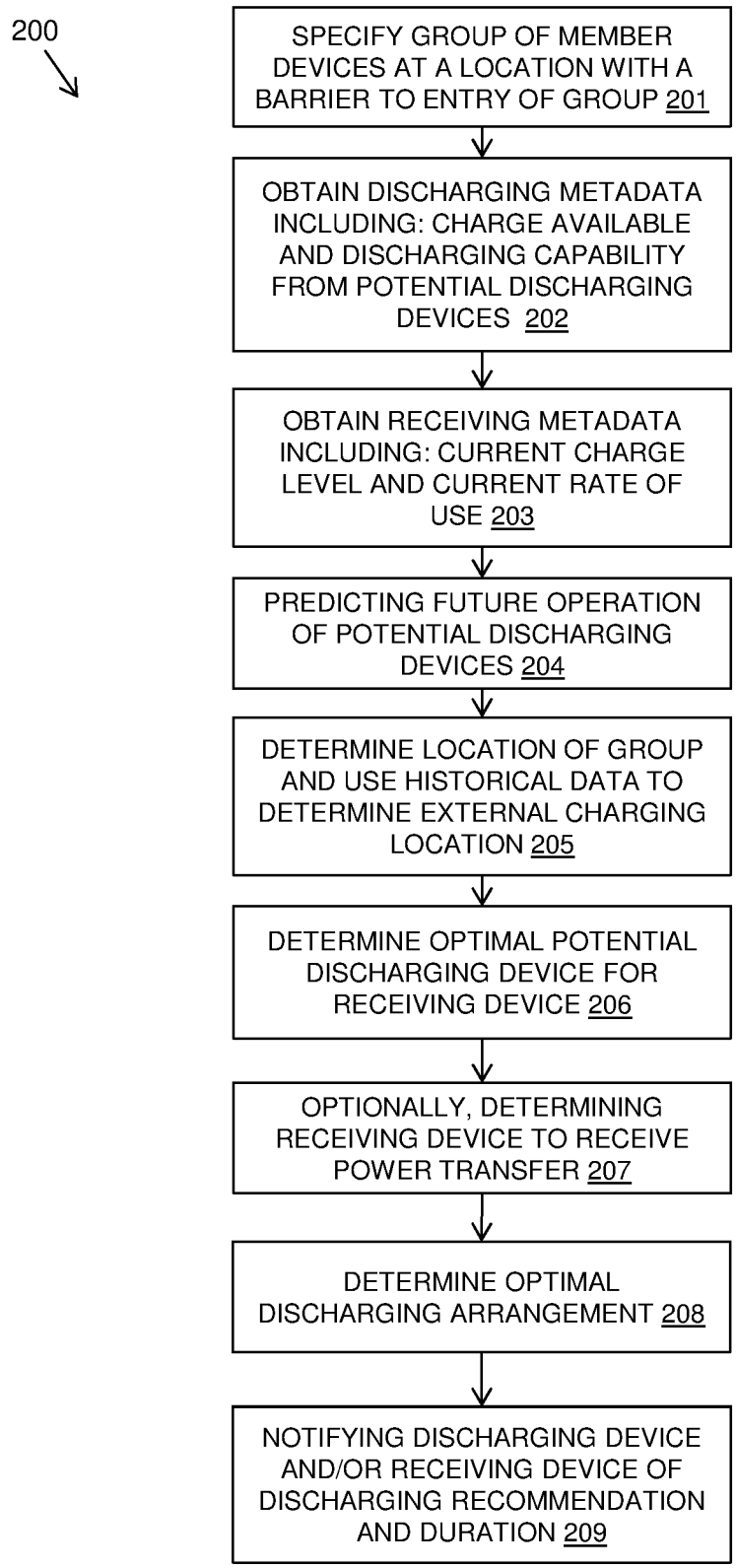
FIG. 2 is a flow diagram of an example embodiment of a method in accordance with the present invention.

Referring to FIG. 2, a flow diagram 200 shows an example embodiment of the described method as carried out at an orchestrating device 150.

The method may specify 201 a group of member devices at a location between which power is capable of being transferred. The orchestrating device 150 may be one of the group of devices and may be a designated device in the group or an initiating device at a current time that requires charge or acts on behalf of another device requiring charge.

Specifying 201 a group of member devices at a location may be by providing a barrier to entry of other non-participating devices at the location. The specified group may be a fixed group of connected member devices at a location or a variable group of mobile devices at a variable location. In an embodiment, the specifying operation may be based on a list of devices input by a user. In an embodiment, the specifying operation may be based on a list of devices that are able to access a particular network, e.g., a local network. A device may be able to access a network with correct authentication key and password. In one embodiment, a barrier to entry may be based in whole or in part on use of an authentication key or password for a particular network or for the specified group of devices.

The orchestrating device 150 may initialize a charge transfer procedure that activates polling of available member devices from the group for discharging metadata over a current period of time via a wireless or physical communication between member devices and the orchestrating device 150.

The method includes obtaining 202 discharging metadata of at least some of the group of member devices that are capable of acting as a discharging device at a current time. The discharging metadata may include at least a charge available in the discharging device for discharging to a receiving device and discharging capability data for discharging the discharging device by current transfer to a receiving device.

The method may also include obtaining 203 receiving metadata for one or more specific receiving devices. The receiving metadata may be obtained locally if the orchestrating device 150 is the device needing charging or may be obtained from another device that is the specified receiving device. One or more recommended optimal or preferred discharging devices may be based on the receiving metadata of a specific receiving device.

In another embodiment, there may be multiple receiving devices that need charging and receiving metadata may be obtained 203 from the multiple receiving devices. This may require the method to recommend one or more optimal discharging devices for charging the multiple receiving devices and may recommend timing and ordering of the discharging to the multiple receiving devices. The receiving metadata may include a current charge level of the receiving device and a current rate of use of the charge of the receiving device.

The method may predict 204 the future operation of potential discharging devices to ensure that a charge available in a potential discharging device for discharging to a receiving device accommodates a remaining charge in the potential discharging device for a predicted operation of the potential discharging device. This prediction may be based on current and/or historical usage of the potential discharging devices.

The method may determine 205 a location of the group of devices by determining one or more of the devices' location and may use historical use data to predict the operation of the potential discharging devices. The location information may also be used to determine a location of a next available external charging point that may be used to estimate a time of the predicted usage needed by the potential discharging devices and/or a time of charge needed by a potential discharging device and a receiving device.

The method may determine 206 one or more optimal or preferred devices to act as a discharging device based on the discharging metadata in combination with the predicted usage and, optionally, the location data. The determining 206 of one or more optimal or preferred devices to act as a discharging device may include ranking or prioritizing the potential discharging devices based on their predicted future use in conjunction with the discharging metadata.

In one embodiment, the determining 206 of an optimal or preferred device to act as a discharging device may include using the discharging capability data and receiving metadata to evaluate discharging from the potential discharging device to a specific receiving device while accommodating the operation of the potential discharging device and the specific receiving device.

The method may, if there are multiple receiving devices needing charging, determine 207 a receiving device or an order of multiple receiving devices to receive the power transfer. Determining 207 a receiving device may include ranking or prioritizing charging of one or more member devices as receiving devices based on use or predicted use of the one or more member devices. The method may determine multiple discharging arrangements to discharge from one or more potential discharging devices to one or more receiving devices simultaneously.

The method may determine 208 an optimal or preferred discharging arrangement and optimal length of discharging time. This may be based on the discharging capability data that is used to determine data relating to a connection between the potential discharging device and a receiving device. This may include: a distance between the potential discharging device and the receiving device; the form of port at the potential discharging device; and the form of connecting cable used. The discharging capability data may also include various discharging options including: use of multiple ports, charging only a single receiving device; charging multiple receiving devices; and an order of connections of multiple receiving devices to the discharging device.

The method may notify 209 a discharging device and/or a receiving device of a discharging recommendation that should be carried out. The notification may specify a recommended charging duration and/or charging arrangement between the recommended discharging device and the receiving device. In some embodiments, a discharging device recommendation two or more discharging devices where each discharging device is suitable.

Embodiment 1

A first embodiment is described in which a group of devices are portable devices in the form of a user's personal electronic devices that the user carries with them on the move. The electronic devices may include a phone, a tablet, a battery bank, a gaming device, etc. The method manages effectively charging devices that the user needs while maintaining enough charge on other devices so that the user can use them.

An application may be installed on each of the group of devices, which allows the devices to communicate their current level of power as well as their current rate of power consumption or average rate for a specified time period, for example, over the past few minutes. Each portable device with the installed application becomes part of a network that transmits this data within the group (for example, via Bluetooth, WiFi or Infrared communication between the devices).

Some of the devices in the network may run a fully functional version of the application, which stores information about the habits of a user. It identifies, using location and charging data from all networked devices, the location of known charging points that the user will use to charge their devices. One of the devices with the fully functional version of the application may provide calculations and make charging recommendations to the other devices.

The described method makes decisions for a user on which device should be charged by which other device, given a current context. By using location data on how far a user is from a known charging point and by looking at usage of each device and power consumption of each device in the network, the method may determine which devices need more power and recommend which devices they should source the power from. Two devices, a discharging device and a device to be charged, may receive notifications of which device they should be connected to. Charging may automatically stop once the desired transfer of power is achieved or a sufficient quantity of power is transferred to ensure use of a device until use is no longer needed or a charging point is reached.

The method determines how much to discharge the finite energy resources in the form of the portable devices in order to balance the future availability of each device and optimizes a device to use as a discharging device using parameters computed from actual and predicted user behavior rather than defined parameters.

Multiple devices can have the capability (e.g. processing power, connections, uptime) to be the orchestrating device with the full functionality of the optimizing application. If a user wants to optimize discharge power to charge his phone, then the phone may become the orchestrating device and distribute power optimally on the network.

However, in the case of a user's smart watch, it may not be capable of orchestrating this as it lacks processing power, and it would then request another more powerful device (e.g. the phone) to orchestrate power management for the watch.

To what extent authentication and authorization is provided for a group of devices is variable for different situations but there may be a barrier of entry so that only the relevant devices nearby are analyzed for power management and not unrelated nearby devices.

The following is an example embodiment of an aspect of the described method of connecting between devices and gathering and sharing the discharging data.

There may be one device specified as the master unit, which is the orchestrating device, and all others may be slave devices. All communication may be carried out through the master unit, and any device with suitable processing capability may be specified as the master unit. The network of a group of member devices may be initialized when any one of the devices opens the application and turns on its networking capability, with the initializing device becoming the master unit.

To join the network a device may need to send the correct authentication key, which is generated by correctly logging into the application using the username and password of the owner of the network.

Upon joining, the master unit may send a message to the connecting unit that contains the identifier and name of each device on the network as well as last known discharging and charging data of each device. The master unit may also sends messages to all other devices notifying them about the new device on the network.

The slave device joining the network may transmit historical discharging and charging data as well as historical location data associated with that discharging and charging data to the master unit.

For numerous devices connecting, the final result is that the master unit knows the discharging and charging data and history and location history of all connected devices and each slave device knows the power level and power drain rate of all devices on the network.

Every few minutes each slave device transmits its current power level and drain rate and may make a request of the master unit to be sent the power state and drain rate of all other devices on the network.

The following describes an example embodiment of intelligent power balancing in the group of devices. The described method makes decisions of which devices to transfer power between.

The process may determine where the user is currently going. Using location history, the orchestrating device can obtain knowledge of common routes that the user travels and habits of the user on such routes. In an embodiment, a user may input common routes. For example, a user may habitually travel a known route to a work or school location by on weekdays or may travel to the home of a friend or relative on weekends.

If it appears a user is following a known route (such as by comparing current location data obtained by Global Positioning System (GPS) with map data for the route), then calculations are performed using that route. If the user is not following a known route, then calculations are done assuming the fastest path to a charging point at the speed at which the user/orchestrating device is currently moving. The figure for speed may be updated every few seconds using GPS signals to look at the difference between the current and last position of the orchestrating device.

Alternatively, the location information may not be factored. The application could send a notification to the user suggesting they head to a particular charging point, which the user can choose a 'yes' or 'no' option with the 'no' option changing how calculations are done and which may assume that the user will not go to a charging station for some time.

By comparing the drain rate of the battery and the current amount of energy stored, it can be determined if the user will make it to a charging station before a specific device loses power. Known schedule patterns or discharge history can be used to influence the prediction of battery usage.

The method checks if the specific device will last until the nearest expected charging station. It may rank or prioritize charging devices that have a high recent use time or are typically used in this time period. Other factors for prioritization could be used, for example, supplying power to at least one device capable of mobile telephony to ensure that a user is able to call emergency services if required.

An example power balancing procedure is as follows. Other balancing procedures between the discharging capacity and the charging needs of the group of devices may be envisaged.

Based on gathered parameters, each device in the network may be given an importance ranking from 1 to N with N being the number of devices in the network and where 1 has the highest priority for charging and N has the lowest. With the current battery level of each device known they are also given a ranking of 1 to N based on their battery level.

A figure may then be calculated which is: "Battery Level Rank"—"Charging Priority Rank", which may be called "Charge Request Potential". If a device has a positive "Charge Request Potential" it requires charging, if zero it requires nothing, and if negative it requires discharging.

The highest and lowest "Charge Request Potential" devices may be identified and matched together. Each device may receive a notification telling it the identity of its partner (a discharging device or a receiving device) and whether it is to be charged or discharged.

The user may then connect a charging cable between the two devices. Charging may stop when the Charge Request Potential for one of the devices exchanging power reaches the mean Charge Request Potential.

Different forms of member devices may have multiple charging arrangements that affect the sourcing current available and the rate of discharge from a discharging device to a receiving device.

Charging arrangements between devices may use a Universal Serial Bus (USB) port. Different types of USB ports may provide different charging currents (for example, varying between 1100 mA to 500 mA at 5V).

The amount of charge may also vary depending on: the current operating mode of the discharging device; on how many USB ports are currently active; on the order of plugging into multiple available USB ports; on whether there is a hub in the connection.

Therefore, the orchestrating device may determine an optimal or preferred charging arrangement for a receiving device to the connected to the discharging device and may notify the user of this arrangement.

An example embodiment of multiple portable electronic devices with their associated charge in milliamp hours (mAh) may be:

Laptop—8500 mAh;
Smart phone—1821 mAh;
Smart watch—205 mAh;
Portable power bank—10000 mAh; and
Gaming device—4310 mAh.

The sourcing current available will be 500 mA/900 mA from a laptop USB port and 2A/1A from a power bank. So, in this example, charging from a laptop will take longer than from a power bank.

A generalization may be made that a power bank will transfer power to another device at 80-90% efficiency. If devices have power transferred between them unnecessarily then at least 10% of the total power transferred is lost each time. While numbers are not available for other devices, it may be assumed that a similar percentage of power is lost during transfer. The described method is therefore very useful as it may prevent a user charging between the wrong devices and losing a significant portion of their total power.

Users may be willing to share power if there is an available prediction for how long a device can be discharged before impacting the user.

Example Scenario 1:

A user is trying to watch a movie on their way home from work on a train on their mobile phone, which they have saved the movie on. As their phone reaches 20% power it alerts the user that it needs charging. The user plugs the phone into their power bank but the rate of charging does not exceed the drain rate of the phone while playing the movie. As a result, the user is unable to watch the movie and is left dissatisfied.

The solution proposed by the described method is one in which the user would be alerted the moment they enter the train or while waiting at the station that they should begin to charge their phone. The method generates the alert recommendation based on a recognition that the route is a habitual route of a particular time duration and that the device is typically used during this time period based on historical data of device use. Depending on the ability of each device to source current as well as their power level, a correct device may be selected to be used to charge the phone so that the user can watch the entire movie.

Example Scenario 2:

A user is abroad in a foreign country and has no idea where they can find a plug socket, as well as not having an adapter. The user is waiting at a train station for a train, and the user often uses their laptop on a train. The user decides to use their phone while waiting and charges their phone using their power bank. The power bank runs out of power in this time. On the train the user decides that they want to use their laptop that is on 30% power. The only remaining device with power is the user's mobile phone, which is at 90% after being charged by the power bank. The user then must charge the laptop with the phone, which is slow and so the laptop runs out of power before the phone fully discharges. In addition, more power is lost due to the inefficient transfer from battery bank to phone to laptop.

The described method may have recommended that the user charge their laptop from the power bank while waiting at the station so that energy is saved and the user can use their laptop while on the train. The recommendation is made by the based on it knowing from historical data that the user has a high usage of their laptop while on trains, and the location of the user, which is determined to be at a train station from which the method predicts the user will travel for an unknown and extended period of time on a new route.

Example Scenario 3:

A family is on a trip where each member of the family has a group of devices including 5 smartphones, 4 tables, 3 gaming devices, 3 laptops, and 3 smart watches. One of the children runs out of power on both their smartphone and gaming device and is upset. One of the parents decides to charge the gaming device of the child with their phone. Using the entire power of the phone brings the device to 30% battery (1293 mAh left on the phone). Within 30 minutes the gaming devices of the two children have run out of power. The parents may fail to consider that one of their work laptops could be used to charge a gaming device to 100% using only 50% of the laptop's battery. As a result, the train journey is stressful.

The described method may ensure that the currently unused laptops have their power distributed to the gaming devices before the smartphones that the parents are currently using based on the metadata obtained from the devices in the group of devices.

The described method understands and predicts the energy requirements of devices with batteries in a network, and how much power they will need in the future. It then uses this prediction to define its ability to provide power to the other devices in the network. The method may determine for how long and at what rate a device can discharge to meet to expected user requirements.

The method may tap into metrics of past energy usage trends, itineraries, and user behaviors to predict requirements for each energy source, and then identify which batteries are suitable for discharging.

Embodiment 2

Another area in which the method may be used is a set of houses that each have a battery and a means of generating electricity, such as a solar panel, such that the set of houses forms a local grid.

Within this grid, a situation may occur in which one user does not have enough power stored in their battery to last them through the night and they want to draw power from a neighbor's battery.

The described method may determine the house from which the power should be drawn based on an understanding of how much power the resident of that house would need in the night as well as taking into account how close the houses are together as power would be lost during transmission with distance increasing this loss. The method may determine that a resident is currently away from their house for a particular time period (which may be determined from historical data or which may be input by a user, for example) and therefore using less energy that may be discharged to a neighbor.

In this embodiment, the method may operate on habitual usage of power in the houses without any consideration being needed of location or movement. In some alternatives, location of the user may be used to determine that a resident is currently away from their house, however, this is not required.

Embodiment 3

In another embodiment, there may be a household power management between household devices and appliances in a house. The household may have a fixed orchestrating device in the form of a home pod or smart meter provided by an energy provider. Usage and charge metadata may be harvested from the household devices and appliances and predictive analytics used to determine optimal power sharing.

Embodiment 4

Another area of application may be a set of electric cars. The described method may be used in a parking lot to identify which is the most suitable car in a parking lot to discharge to power a car needing to be charged.

Location and historical usage may be used to determine that a car is needed for a short commute, so it is acceptable to discharge 50% of the battery power to another car.

Similarly, an electric car may want to drive itself to recharge. A nearest charging location may be determined.

Figure 3:
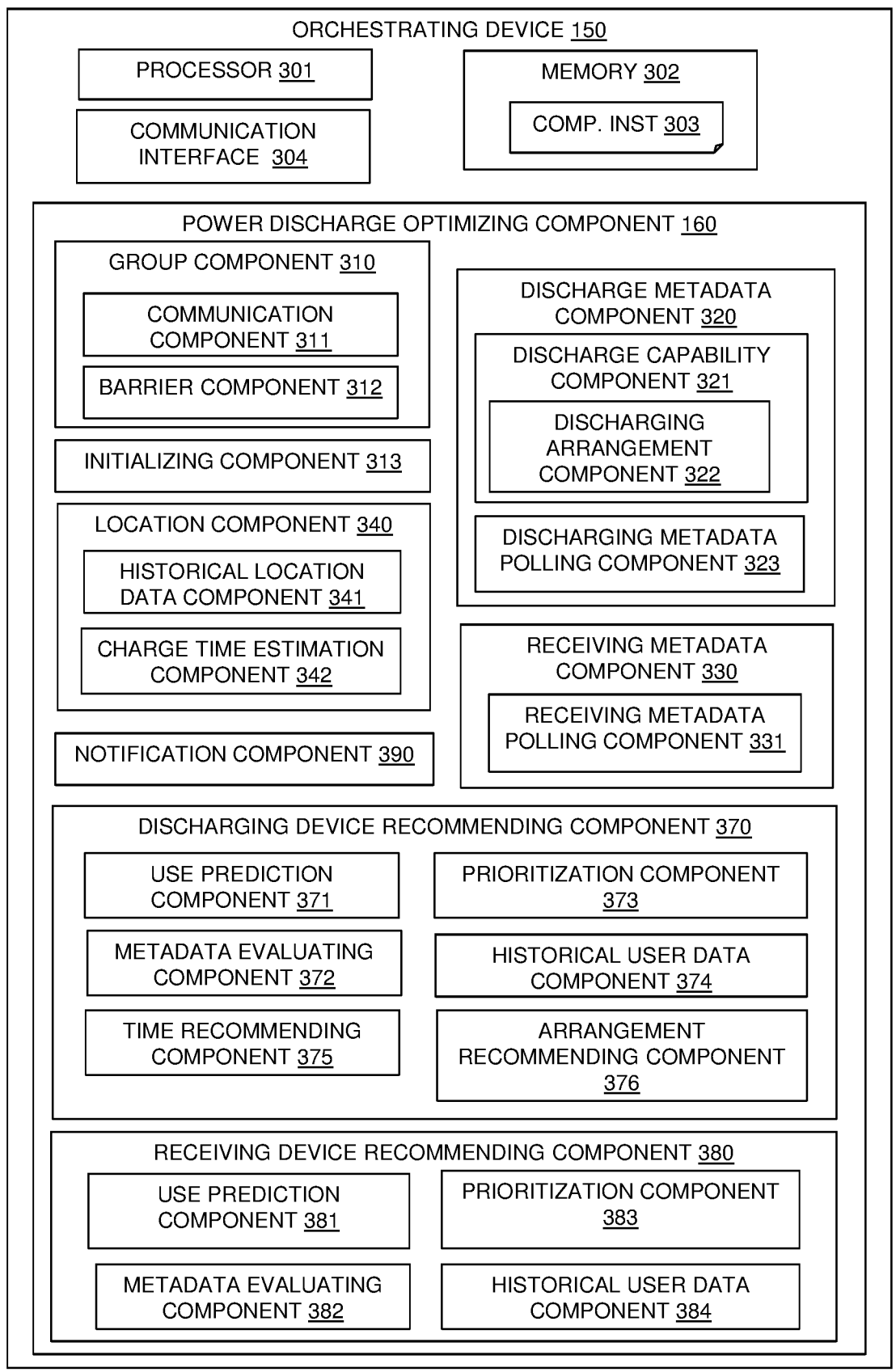
FIG. 3 is a block diagram of an example embodiment of an orchestrating device of a system in accordance with the present invention.

Referring to FIG. 3, an example embodiment of an orchestrating device 150 is shown. As discussed, an orchestrating device 150 may be one of the group of member devices that initiates a discharging procedure to optimize power discharge by selecting a device from which to discharge power to itself or to another device. Alternatively, the orchestrating device 150 may be a dedicated orchestrating device for a group of devices, for example, a dedicated device at a fixed location that optimizes power discharge between the member devices.

The orchestrating device 150 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components. The orchestrating device 150 may include a communication interface 304 for communication with other devices.

The orchestrating device 150 may run a power discharge optimizing component 160 which may communicate with similar power discharge optimizing components 160 on other devices or with simpler power components 111, 141 on other devices that may not act as orchestrating devices themselves but may be capable of acting as discharging devices 110, 120, 130 or may be receiving devices 140. The power components 111, 141 may collect discharging metadata 112 and/or receiving metadata 142 for use in managing power discharge without processing an power discharge optimizing procedure at that device.

The power discharge optimizing component 160 may include a group component 310 for specifying a group of member devices at a location between which power is capable of being transferred. The group component 310 may include a communication component 311 enabling communication between each of the group of member devices and the orchestrating device 150 via a network or close proximity communication means such as Bluetooth, WiFi or Infrared communication. The group component 310 may also include a barrier component 312 for providing a barrier to entry to the group of member devices of non-participating devices at the location. The barrier component 312 may allow entry to a fixed group of connected member devices at a location or a variable group of mobile devices at a location.

The orchestrating device 150 may include an initializing component 313 for initializing a power discharge optimization for the charging the orchestrating device 150 itself or on behalf of another member device.

The power discharge optimizing component 160 may include a discharge metadata component 320 for obtaining discharging metadata of at least some of the group of member devices that are capable of acting as a discharging device at a current time. The discharging metadata includes: a charge available in the discharging device for discharging to a receiving device; and discharging capability data for discharging the discharging device by current transfer to a receiving device. The discharge metadata component 320 may include a discharge metadata polling component 323 for polling available member devices from the group for discharging metadata over a current period of time via a wireless communication between member devices and the orchestrating device.

The discharge metadata component 320 may evaluate the received discharge metadata on its own merit for use with any receiving device or in reference to receiving metadata of one or more specific receiving devices and the power discharge optimizing component 160 may include a receiving metadata component 330 for obtaining receiving metadata for a specific receiving device including a current charge level of the receiving device and a current rate of use of the charge of the receiving device. The receiving metadata component 330 may include a receiving metadata polling component 331.

The discharge metadata component 320 may include a discharge capability component 321 for determining the discharging capability data relating to a connection between the discharging device and a receiving device including one or more of: a distance between the discharging device and the receiving device; the form of port at the discharging device; and the form of connecting cable used. The discharging capability component 321 may include a discharging arrangement component 322 for determining the discharging capability data for various discharging options including: use of multiple ports, charging only a single receiving device; charging multiple receiving devices; and an order of connections of multiple receiving devices to the discharging device.

In one embodiment, the power discharge optimizing component 160 may include a location component 340 for determining a current location of the group of member devices and a historical location data component 341 for using historical user data for the group of member devices together with the location data to determine likely routes and uses of devices by the user and a charge time estimation component 342 for determining an estimated time to an external charging location based on the historical data.

The power discharge optimizing component 160 may include a discharging device recommending component 370 for determining an optimal or preferred device to act as a discharging device from the discharging metadata and other available data. The discharging device recommending component 370 may include a use prediction component 371 for predicting a future usage of a device. The predicted usage may be based on historical user data provided by a historical user data component 374 and may also be based on data of the location component 340 including the historical location data component 341.

The discharging device recommending component 370 may also include a prioritization component 373 to rank or prioritize possible discharging devices in the selection process that may be based on use, such as a need for emergency communication.

The discharging device recommending component 370 may include a metadata evaluating component 372 for evaluating the discharging metadata and optionally the receiving metadata to recommend a discharging device or devices. The discharging device recommending component 370 may also include a time recommending component 375 for recommending a discharge time from the recommended device and may include an arrangement recommending component 376 for determining an optimal or preferred discharging arrangement (for example, the charging ports, order of attachments, etc.).

In one embodiment in which there are more than one possible receiving devices, the power discharge optimizing component 160 may also include a receiving device recommending component 380 for determining a receiving device to receive a transfer of power from the discharging device.

The receiving device recommending component 380 may include a metadata evaluating component 382 for evaluating the receiving metadata to recommend a receiving device for recharging. The receiving device recommending component 380 may also include a use prediction component 381 for predicting use of the receiving devices, a prioritization component 383 for ranking or prioritizing charging one or more member devices as receiving devices based on use of the one or more member devices, and a historical user data component 384 for processing historical user data for the receiving devices to aid with the recommendation.

The power discharge optimizing component 160 may also include a notification component 390 for sending a notification to a receiving device to obtain charge from a recommended discharging device and/or sending a notification to a recommended discharging device to discharge to a receiving device. The notification component 390 may include specifying a recommended charging duration and/or charging arrangement between the recommended discharging device and the receiving device.

Figure 4:
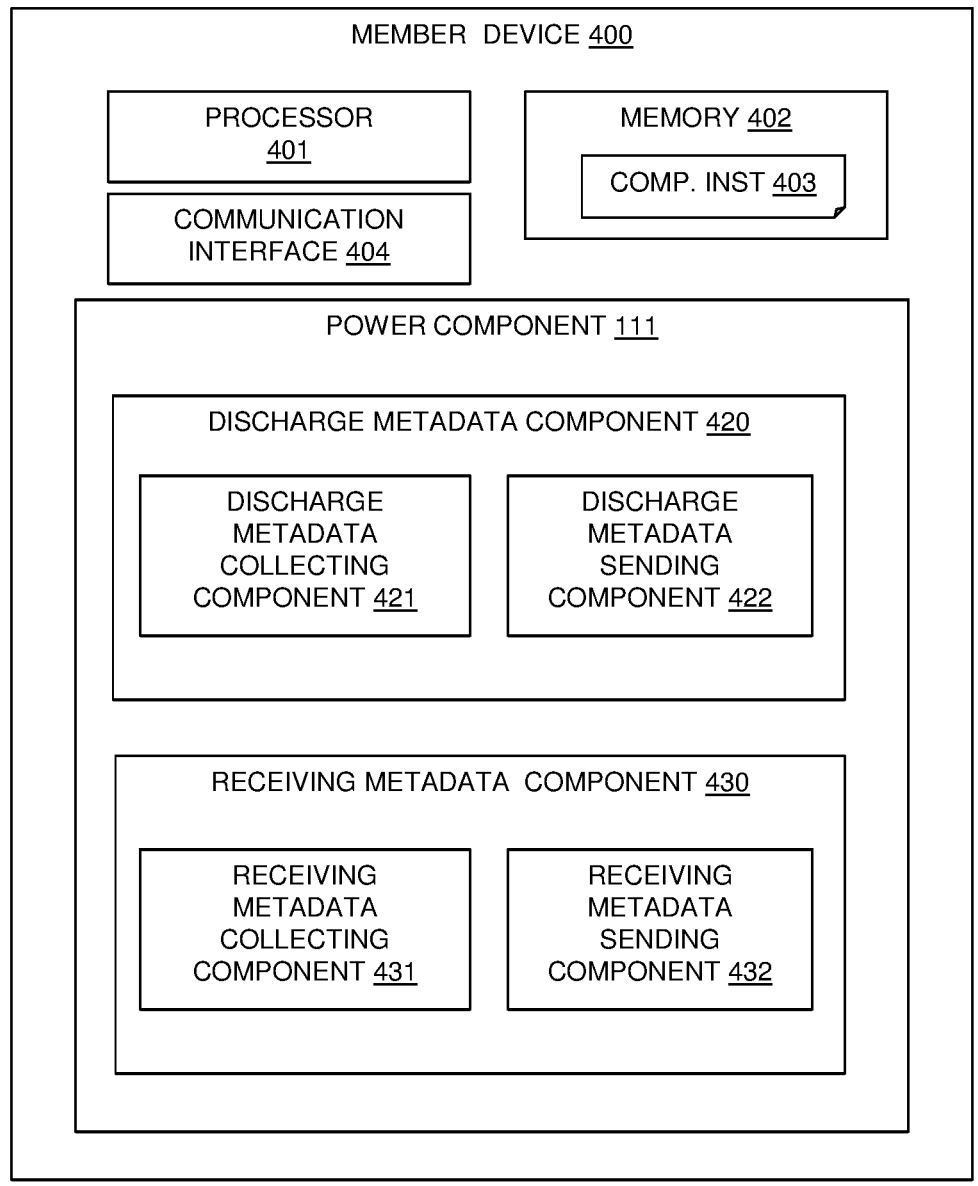
FIG. 4 is a block diagram of an example embodiment of member device of a system in accordance with the present invention.

Referring to FIG. 4, an example embodiment of a member device 400 is shown in which the member device 400 may be a device that may or may not also act as an orchestrating device 150 and may be capable of acting as discharging devices 110, 120, 130 or may be receiving devices 140. The power components 111, 141 may collect discharging metadata 112 and, optionally, receiving metadata 142 without processing a discharging procedure to optimize power discharge.

The member device 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components. The member device 400 includes a communication interface 404 for communication with other devices.

The member device 400 may include a power component 111 including a discharge metadata component 420 and/or a receiving metadata component 430 depending on whether the member device 400 is capable of being a discharging device, a receiving device, or both. The discharge metadata component 420 includes a discharge metadata collecting component 421 for collecting discharge metadata from the member device 400 and a discharge metadata sending component 422 for sending the discharge metadata to an orchestrating device 150. The receiving metadata component 430 includes a receiving metadata collecting component 431 for collecting receiving metadata from the member device 400 and a receiving metadata sending component 432 for sending the receiving metadata to an orchestrating device 150.

Figure 5:
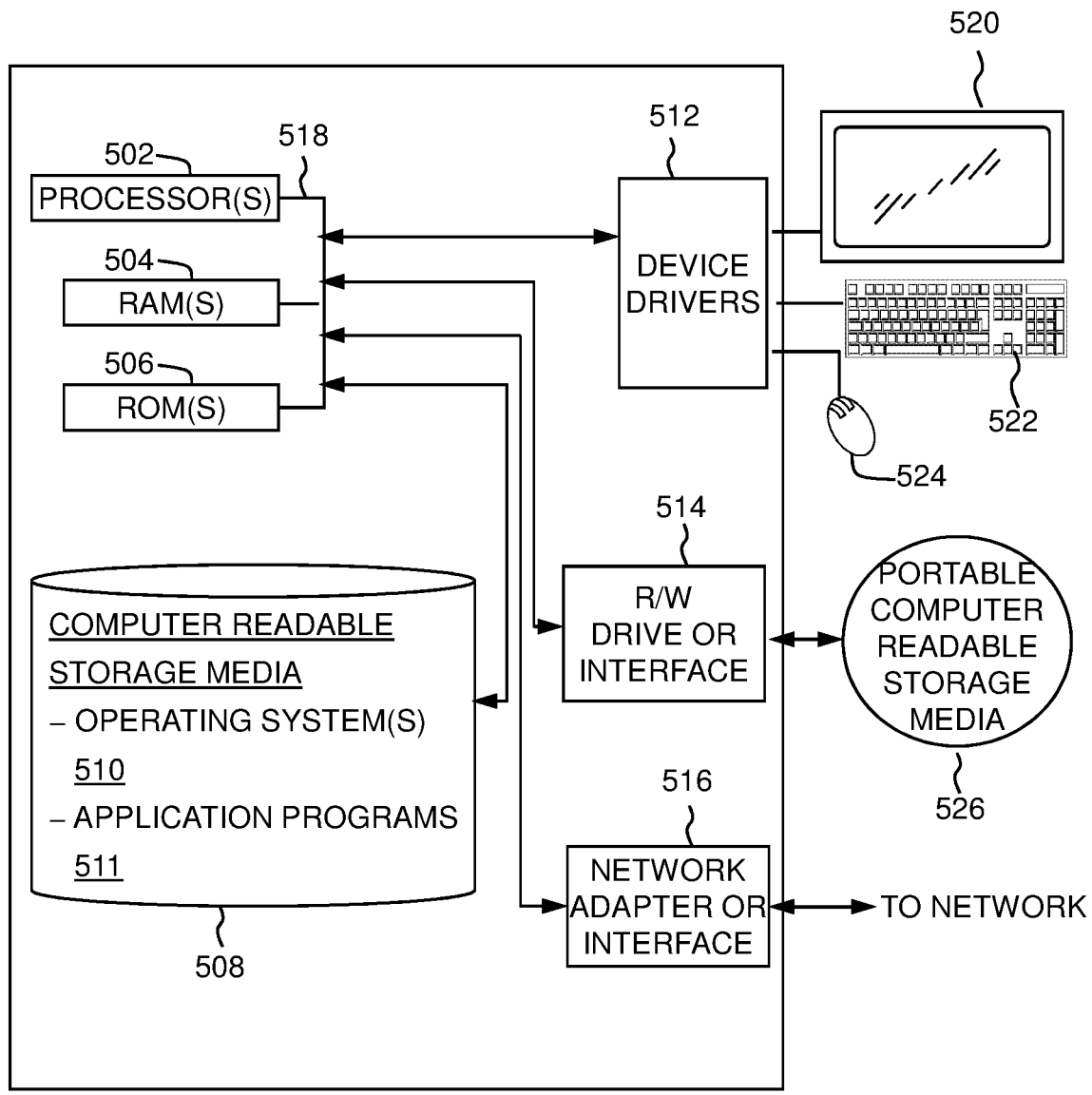
FIG. 5 is a block diagram of an embodiment of a computer system or cloud server in which the present invention may be implemented.

FIG. 5 depicts a block diagram of components of a computing device such as an orchestrating device 150 or a member device 400 of FIGS. 3 and 4, in accordance with an embodiment. It should be appreciated that FIG. 5 provides only an illustration of one implementation and does not imply any limitations with regard to the environments in which different embodiments may be implemented. Many modifications to the depicted environment may be made.

Computing device can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the power components 111, 121 and power discharge optimizing component 160, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 514 to read from and write to one or more portable computer readable storage media 526. Application programs 511 on computing device can be stored on one or more of the portable computer readable storage media 526, read via the respective R/W drive or interface 514 and loaded into the respective computer readable storage media 508.

Computing device can also include a network adapter or interface 516, such as a TCP/IP adapter card or wireless communication adapter. Application programs 511 on computing device can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing device can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing may be used in particular in processing power discharge optimization in electric car or home scenarios.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
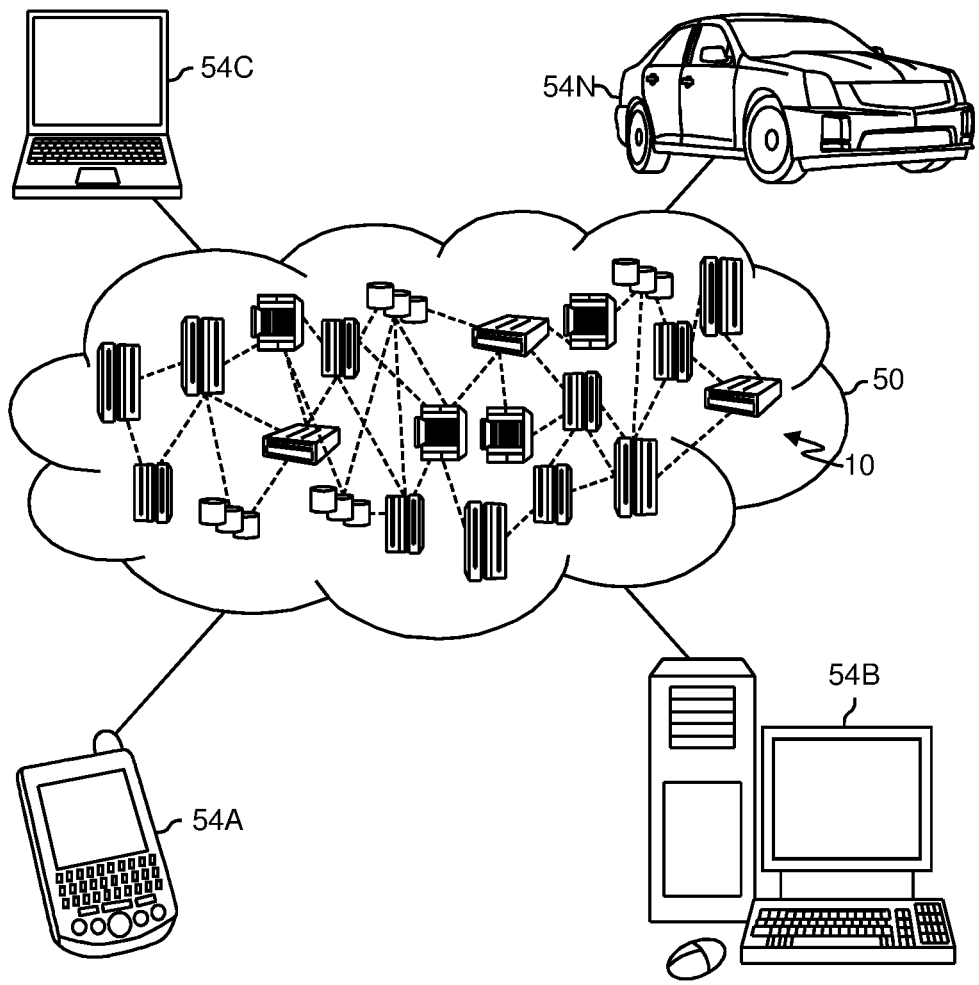
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 7:
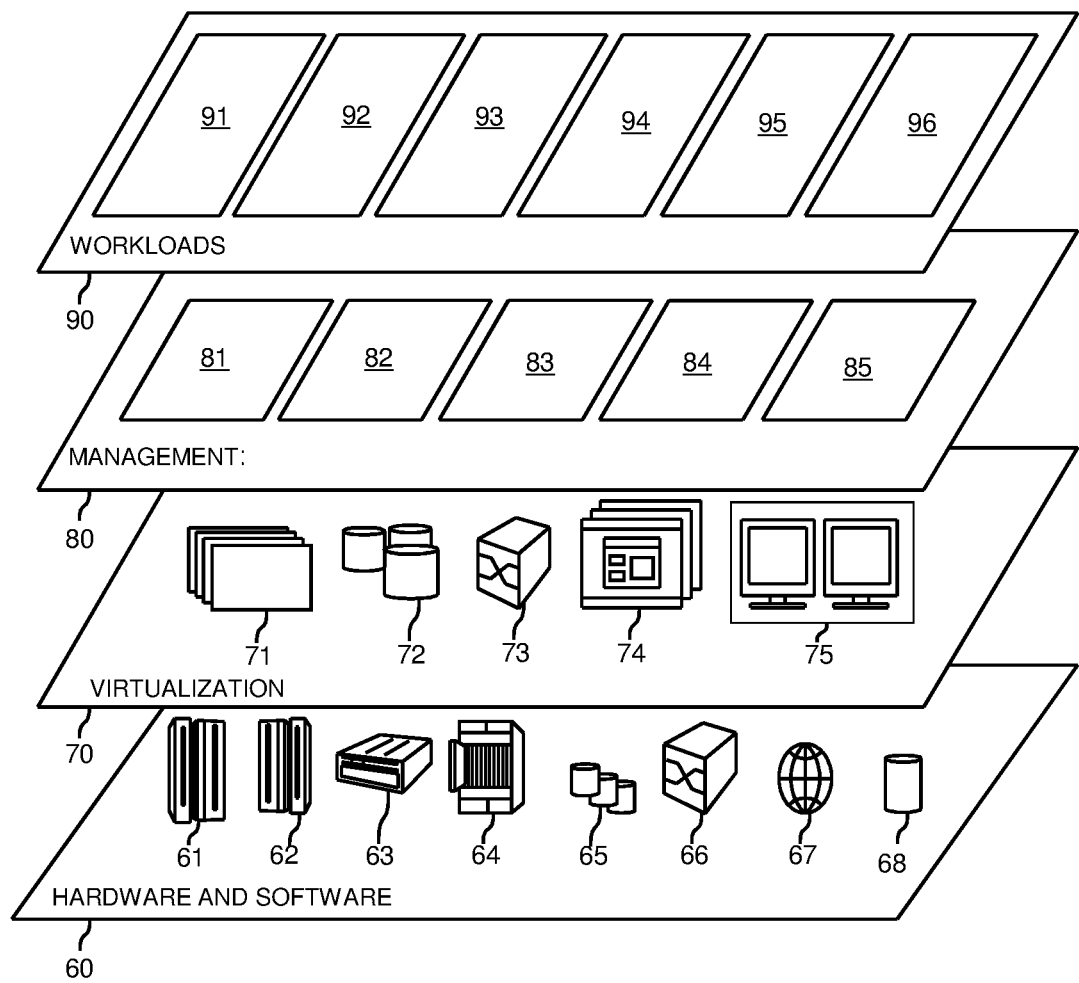
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power discharge optimization processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for managing power discharge within a group of devices carried out by an orchestrating device, comprising:

determining a location information of a group of member devices each held by an individual, the location information used to determine a location of a next available charging point for charging all member devices and an estimated time needed by the member devices to reach the next available charging point;

obtaining discharging metadata of one or more of the group of member devices that are potential discharging devices capable of acting as a discharging device at a current time, wherein the discharging metadata includes:

a charge available in the discharging device for discharging to a receiving device, and discharging capability data for discharging the discharging device by current transfer to a receiving device; and determining a preferred potential discharging device to act as a discharging device of the group of member devices held by the individual based on evaluation of the discharging metadata, the estimated time needed by the member devices to reach the next available charging point, and ranking the potential discharging devices based on a predicted future usage of potential discharging devices in conjunction with the discharging metadata.

2. The method of claim 1, wherein determining a preferred device to act as a discharging device includes ensuring that a charge available in a potential discharging device for discharging to a receiving device accommodates a remaining charge in the potential discharging device for a predicted operation of the potential discharging device.

3. The method of claim 2, wherein determining a preferred potential discharging device includes predicting a future usage of a potential discharging device based on historical use data or location data.

4. The method of claim 1, further comprising:

obtaining receiving metadata for a specific receiving device, wherein determining a preferred potential discharging device is additionally based on the receiving metadata of a specific receiving device.

5. The method of claim 4, wherein determining a preferred potential discharging device includes using the discharging capability data and the receiving metadata to evaluate discharging from the potential discharging device of the group of member devices to a specific receiving device of the group of member devices while accommodating the operation of the potential discharging device and the specific receiving device.

6. The method of claim 4, wherein the receiving metadata includes:

a current charge level of the receiving device, and
a current rate of use of the charge of the receiving device.

7. The method of claim 1, wherein the discharging capability data includes or is used to determine data relating to a connection between the potential discharging device and a receiving device including:

a form of port at the potential discharging device; or
a form of connecting cable used.

8. The method of claim 1, wherein the discharging capability data includes various discharging options including one or more of:

use of multiple ports;
charging only a single receiving device; or
an order of connections of multiple receiving devices to the discharging device.

9. The method of claim 1, further comprising:

determining a preferred discharging arrangement and preferred length of discharging time.

10. The method of claim 1, further comprising:
determining a receiving device to receive a transfer of power from the discharging device, and
ranking charging one or more member devices as receiving devices based on a use or a predicted use of the one or more member devices.

11. The method of claim 1, further comprising:
sending a notification to a receiving device to obtain charge from a recommended discharging device, or
sending a notification to a recommended discharging device to discharge to a receiving device.

12. The method of claim 11, further comprising:
specifying a recommended charging duration or charging arrangement between the recommended discharging device and the receiving device.

13. The method of claim 1, wherein specifying a group of member devices includes specifying a barrier to entry of non-participating devices at the location and further includes:
a variable group of mobile devices at a location.

14. The method of claim 1, wherein the orchestrating device is one of the specified group of devices and is one of:
a designated device in the group; or
an initiating device at a current time, wherein the initiating device requires charge or acts on behalf of another device requiring charge.

15. The method of claim 1, further comprising:
determining a current location of the group of member devices; and
using historical user data for the group of member devices to determine an estimated time to an external charging location for each member device of the group of member devices; and
including the estimated time when determining a preferred potential discharging device.

16. The method of claim 1, further comprising:
initializing a charge transfer procedure by the orchestrating device; and
polling available member devices from the group for discharging metadata over a current period of time via a wireless communication between member devices and the orchestrating device.

17. A system for managing power discharge within a group of devices, comprising:
an orchestrating device in communication with the group of devices and having a processor and a memory configured to provide computer program instructions to the processor to execute instructions for performing functions of components the orchestrating device, the components including:
a location component for determining a current location of the group of member devices each held by an individual;
a historical location component for using historical user data for the group of member devices;
a charge time estimation component for determining an estimated time for the group of member devices to reach an external charging location for charging all member devices;
a discharge metadata component for obtaining discharging metadata of one or more of the group of member devices that are potential discharging devices capable of acting as a discharging device at a current time, wherein the discharging metadata includes:
a charge available in the discharging device for discharging to a receiving device, and
discharging capability data for discharging the discharging device by current transfer to a receiving device;
a discharging device recommending component for determining a preferred potential discharging device of the group of member devices held by the individual based on evaluation of the discharging metadata; and
a receiving metadata component for receiving metadata for a specific receiving device, wherein determining a preferred potential discharging device is additionally based on the receiving metadata of a specific receiving device, the current location of the group of member devices, the historical user data, and the estimated time needed by devices to reach the external charging location.

18. The system of claim 17, the components further including:
a use prediction component for predicting a future usage of a device;
wherein the discharging device recommending component is capable of ensuring that a charge available in a potential discharging device for discharging to a receiving device accommodates a remaining charge in the potential discharging device for a predicted operation of the potential discharging device.

19. The system of claim 17, the components further including:
a notification component for sending a notification to a receiving device to obtain charge from a recommended discharging device or sending a notification to a recommended discharging device to discharge to a receiving device.

20. The system of claim 17, wherein the orchestrating device is one of the specified group of devices and is one of:
a designated device in the group; or
an initiating device at a current time, wherein the initiating device requires charge or acts on behalf of another device requiring charge.

21. The system of claim 17, the components further including:
an initializing component for initializing a charge transfer procedure by the orchestrating device; and
a metadata polling component for polling available member devices from the group for discharging metadata over a current period of time via a wireless communication between member devices and the orchestrating device.

22. A computer program product for managing power discharge within a group of devices carried out by an orchestrating device, the computer program product comprising a computer readable storage medium having program instructions embodied therewith, the program instructions executable by a processor to cause the processor to:
determine a location information of a group of member devices each held by an individual, the location information used to determine a location of a next available external charging point for charging all member devices and an estimated time needed by the member devices to reach the next available charging point;
obtain discharging metadata of at least some of the group of member devices that are potential discharging devices capable of acting as a discharging device at a current time, wherein the discharging metadata includes:
a charge available in the discharging device for discharging to a receiving device, and discharging capability data for discharging the discharging device by current transfer to a receiving device; and determine a preferred potential discharging device to act as a discharging device of the group of member devices held by the individual based on evaluation of the discharging metadata and the estimated time needed by the member devices to reach the next available charging point.

* * * * *